United States Patent
Wing et al.

(10) Patent No.: US 7,773,595 B2
(45) Date of Patent: Aug. 10, 2010

(54) SYSTEM AND METHOD FOR PARSING FRAMES

(75) Inventors: Malcolm J. Wing, Palo Alto, CA (US); Jay B. Patel, Los Gatos, CA (US); Jeffrey M. Schroeder, San Jose, CA (US)

(73) Assignee: Agate Logic, Inc., Cupertino, CA (US)

( * ) Notice: Subject to any disclaimer, the term of this patent is extended or adjusted under 35 U.S.C. 154(b) by 375 days.

(21) Appl. No.: 11/855,697

(22) Filed: Sep. 14, 2007

(65) Prior Publication Data

US 2009/0073970 A1 Mar. 19, 2009

(51) Int. Cl.
*H04L 12/56* (2006.01)
*H04J 1/16* (2006.01)
(52) U.S. Cl. .................. 370/389; 370/230; 709/238
(58) Field of Classification Search .............. 370/389, 370/230, 237, 238; 709/238–242
See application file for complete search history.

(56) References Cited

U.S. PATENT DOCUMENTS

| | | | |
|---|---|---|---|
| 2003/0118022 A1* | 6/2003 | Kulkarni et al. | 370/392 |
| 2006/0002386 A1* | 1/2006 | Yik et al. | 370/389 |
| 2006/0280178 A1* | 12/2006 | Miller et al. | 370/389 |
| 2008/0253398 A1* | 10/2008 | Calvignac et al. | 370/474 |

\* cited by examiner

*Primary Examiner*—John Pezzlo
(74) *Attorney, Agent, or Firm*—James M. Wu; JW Law Group

(57) ABSTRACT

A system for parsing frames including a first cell extraction circuit (CEC) configured to identify a first cell from a first frame, a first parser engine operatively connected to the first CEC, where the first parser engine is configured to generate a result based on the first cell, and a first forwarding circuit operatively connected to the first parser engine and configured to forward the result, where the first CEC, the first parser engine, and the first forwarding circuit are associated with a first frame parser unit.

17 Claims, 12 Drawing Sheets

FRAME PARSER RING 500

US 7,773,595 B2

SYSTEM AND METHOD FOR PARSING FRAMES

CROSS-REFERENCE TO RELATED APPLICATIONS

The present application contains subject matter that may be related to the subject matter in U.S. application Ser. No. 11/855,666 entitled: "Heterogeneous Configurable Integrated Circuit", filed on Sept. 14, 2007, and assigned to the assignee of the present invention.

The present application also contains subject matter that may be related to the subject matter in U.S. application Ser. No. 11/901,182 entitled: "High-Bandwidth Interconnect Network for an Integrated Circuit", filed on Sep. 14, 2007, and assigned to the assignee of the present application.

The present application also contains subject matter that may be related to the subject matter in U.S. application Ser. No. 11/855,721 entitled: "Reconfigurable Content-Addressable Memory", filed on Sep. 14, 2007, and assigned to the assignee of the present invention.

The present application also contains subject matter that may be related to the subject matter in U.S. application Ser. No. 11/855,740 entitled: "Memory Controller for Heterogeneous Configurable Integrated Circuit", filed on Sep. 14, 2007, and assigned to the assignee of the present invention.

The present application also contains subject matter that may be related to the subject matter in U.S. application Ser. No. 11/855,761 entitled: "General Purpose Input/Output System and Method", filed on Sep. 14, 2007, and assigned to the assignee of the present invention.

All mentioned U.S. applications are hereby incorporated by reference.

BACKGROUND

A network may be considered a group of stations (e.g., personal computers, servers, mainframes, telephones, etc.) connected to exchange information (i.e., communicate). The transmission medium connecting the group of stations may contain wired and/or wireless segments (e.g., parallel two-wire, twisted pair, shielded pair, coaxial line, waveguide, fiber-optics, satellite, infra-red, etc.). Communication may take place using packets that are exchanged between two or more stations in the group of stations.

Network processing may be considered the management and movement of packet-based communication traffic using network processing hardware. Frame parsing is a key function performed in a network processing application. Frame parsing often includes the extraction and analysis of the contents of a packet header field(s) and the generation of parsing results which guide the subsequent processing of the frame by other hardware and/or software processing elements.

SUMMARY

In general, in one aspect, the invention relates to a system for parsing frames. The system includes a first cell extraction circuit (CEC) configured to identify a first cell from a first frame; a first parser engine operatively connected to the first CEC, where the first parser engine is configured to generate a result based on the first cell; and a first forwarding circuit operatively connected to the first parser engine and configured to forward the result, where the first CEC, the first parser engine, and the first forwarding circuit are associated with a first frame parser unit.

In general, in one aspect, the invention relates to a method for parsing frames. The method includes identifying a first header cell and a plurality of body cells associated with a first frame; transferring the first header cell to a first parser engine of a plurality of parser engines; executing a plurality of instructions to generate a first result based on the first header cell; and outputting the first result from the first parser engine.

Other aspects of the invention will be apparent from the following description and the appended claims.

DETAILED DESCRIPTION

Figure 1:
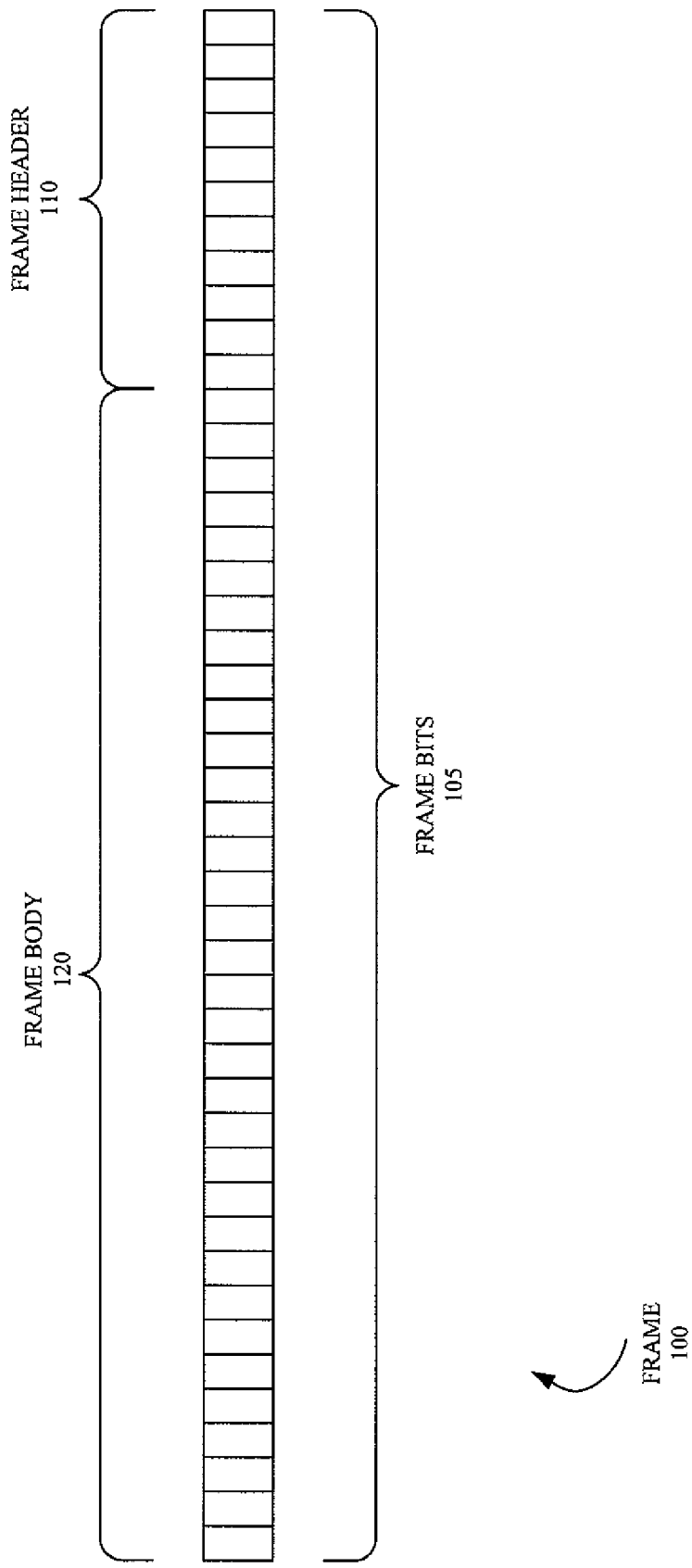
FIG. 1 shows a frame in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to parse frames. In general, embodiments of the invention provide a system and method to parse frames using one or more frame parser units on a heterogeneous configurable integrated circuit.

FIG. 1 shows a frame (100) in accordance with one or more embodiments of the invention. As shown in FIG. 1, the frame (100) may include one or more bits of data (105). A set of bits commencing the frame may be referred to as a frame header (110). The remaining frame bits, including the bits at the end of the frame (100), may be referred to as the frame body (120). The frame (100) may be of any size (i.e., may include any number of bits) and the frame header (110) may be of any size smaller than or equal to the frame (100). In one or more embodiments of the invention, the frame header (110) includes information in regarding the frame (100) including, for example, a destination of the frame, a size of the frame, a type of data contained in the frame body, etc. Such information may be included in fields within the header.

Figure 2:
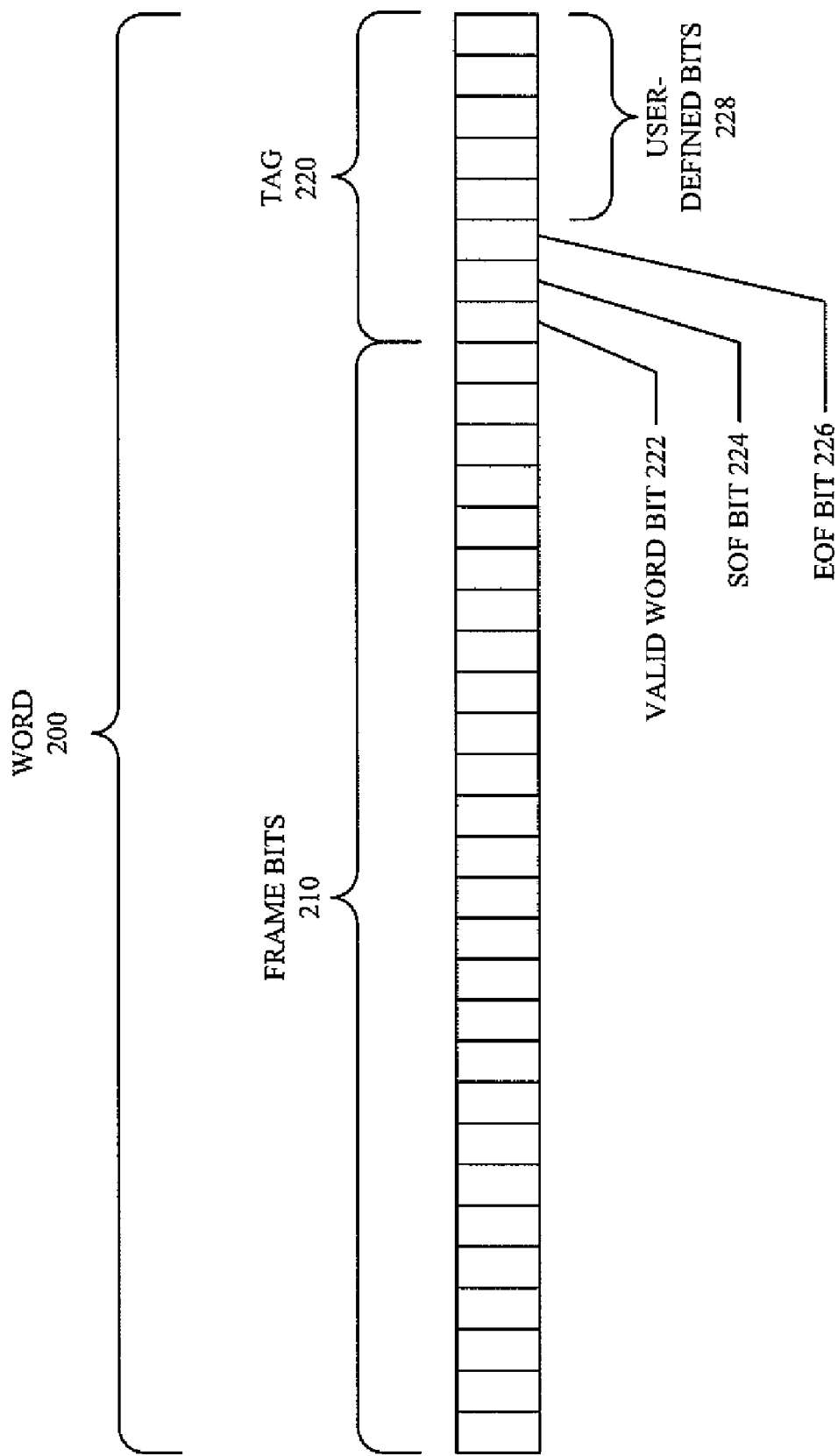
FIG. 2 shows a word in accordance with one or more embodiments of the invention.

In one or more embodiments of the invention, the frame (100) is represented by one or more words. FIG. 2 shows a word (200) in accordance with one or more embodiments of the invention. As shown in FIG. 2, the word (200) may include multiple frame bits (210) (i.e., bits from the frame (100)) and a tag (220) associated with the frame bits (210). In one or more embodiments of the invention, the word (200) is 40 bits in size, with 8 bits of the word forming the tag (220), and 32 bits of the word corresponding to the frame bits (210).

In one or more embodiments of the invention, the tag (220) includes a valid word bit (VW) (222), a start of frame (SOF) bit (224), an end of frame (EOF) bit (226), and one or more user-define bits (228). The valid word bit (222) may be a boolean value indicating whether the associated frame bits (210) are valid. The SOF bit (224) may be a boolean value indicating whether the frame bits (210) are the starting bits of the frame. In other words, the SOF bit (224) may indicate whether the word (200) is the first word of the frame. The EOF bit (226) may be a boolean value indicating whether the frame bits (210) are the final bits of the frame. In other words, the EOF bit (226) may indicate whether the word (200) is the final word of the frame.

Figure 3:
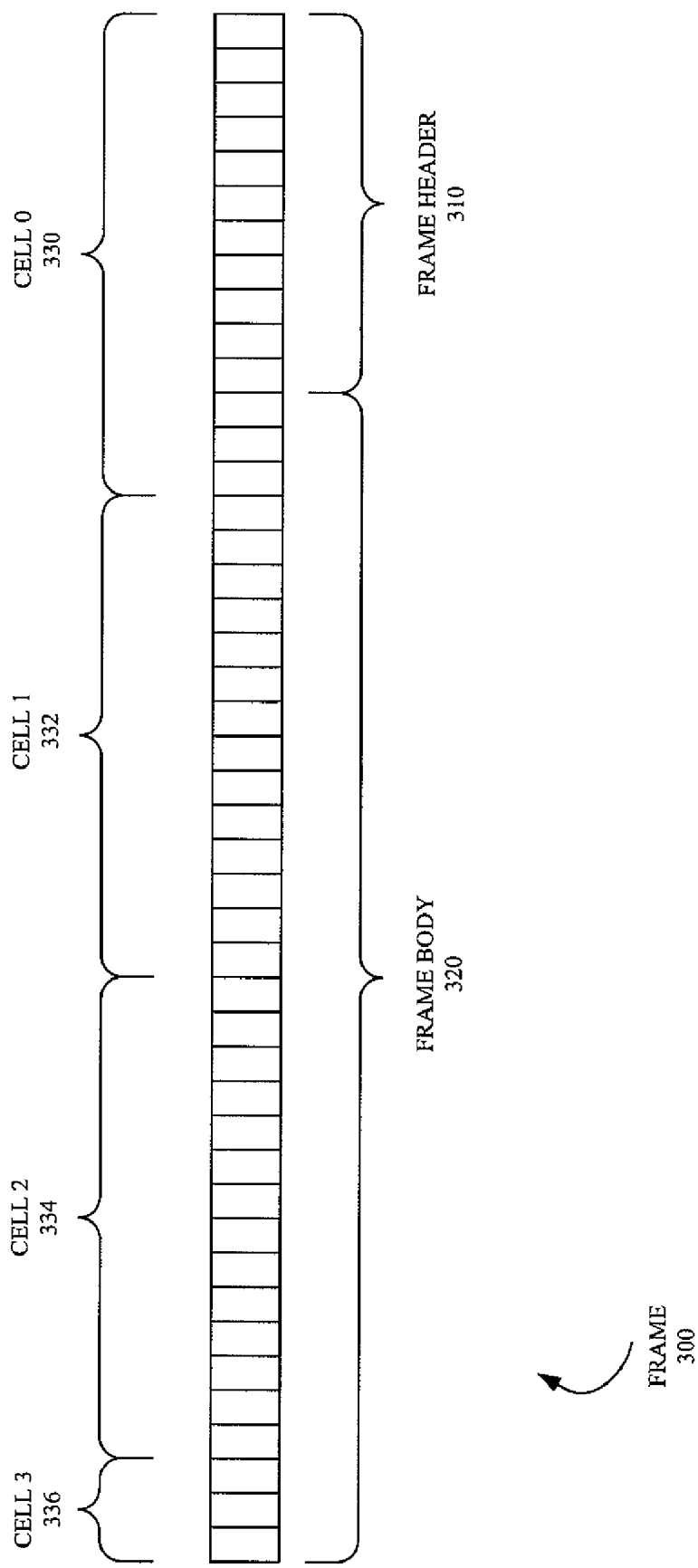
FIG. 3 shows multiple cells in accordance with one or more embodiments of the invention.

In one or more embodiments of the invention, a frame is partitioned into one or more cells. FIG. 3 shows a frame (300) partitioned into multiple cells (i.e., Cell 0 (330), Cell 1 (332), Cell 2 (334), Cell 3 (336)). The frame (300) is essentially the same as frame (100) discussed above in reference to FIG. 1. Similarly, the frame header (310) and the frame body (320) are essentially the same as the frame header (110) and the frame body (120), respectively, discussed above in reference to FIG. 1. A cell may include a single frame bit or any number of consecutive frame bits. A cell that includes at least the bits of the frame header (i.e., Cell 0 (330)) may be referred to as a header cell. A cell that includes only bits of the frame body (i.e., Cell 1 (332), Cell 2 (334), Cell 3 (336)) may be referred to as a body cell. In other words, a frame that does not include the frame header may be referred to as a body cell.

In one or more embodiments of the invention, a maximum cell size (i.e., the maximum number of frame bits permitted in a cell) is predefined. In one or more embodiments of the invention, the maximum cell size is specified as a number of words (e.g., Word (200)). In one or more embodiments of the invention, the maximum cell size must be at least the size of the frame header (310).

Figure 4:
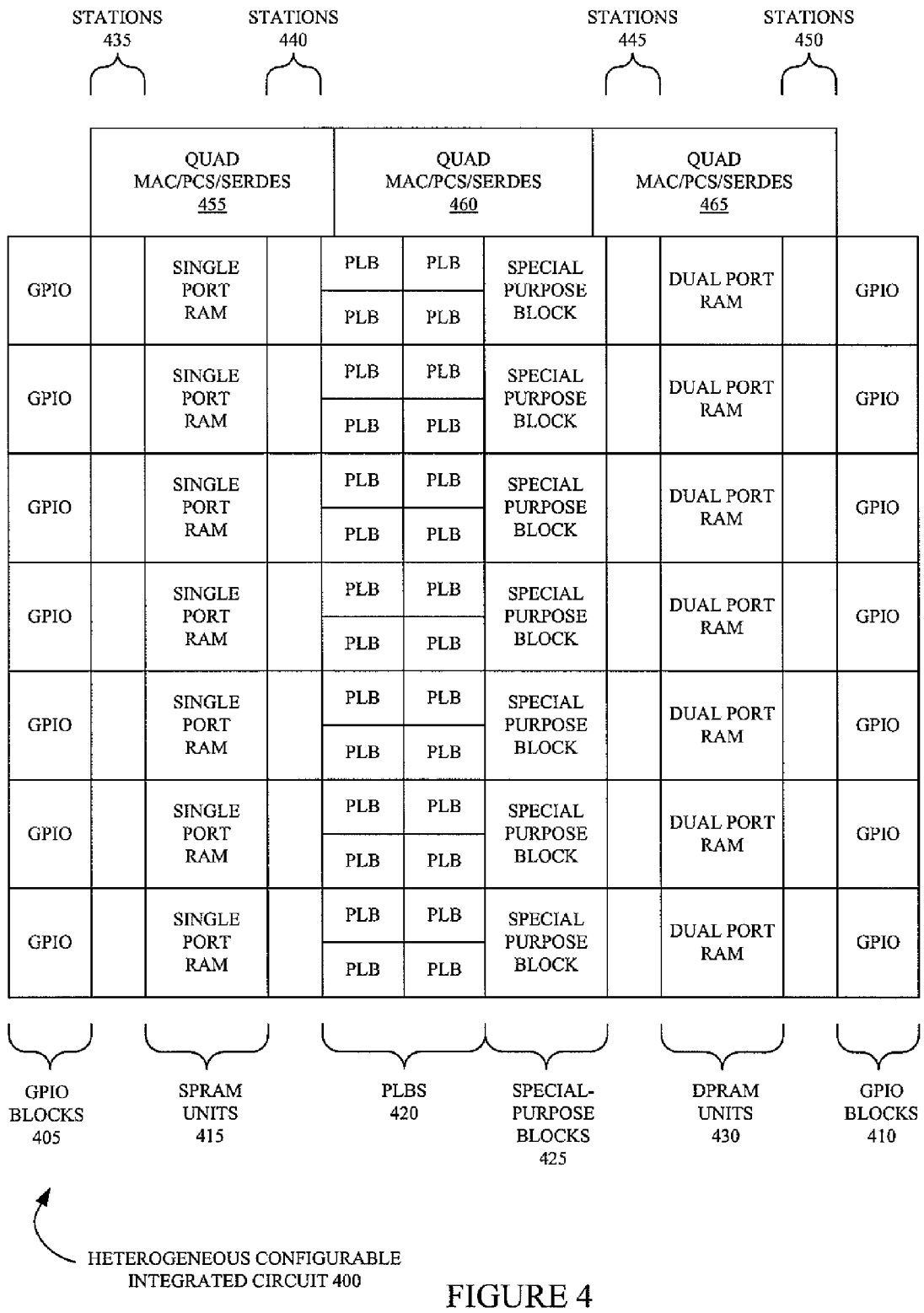
FIG. 4 shows a heterogeneous configurable integrated circuit in accordance with one or more embodiments of the invention.

FIG. 4 shows part of a heterogeneous configurable integrated circuit (HCIC) (400) in accordance with one or more embodiments of the invention. As shown in FIG. 4, the HCIC (400) has numerous components including one or more columns of general purpose input/output (GPIO) blocks (405, 410), at least one column of single port ram units (SPRAM) (415), multiple columns of PLBs (420), at least one column of special-purpose blocks (425), at least one column of dual port RAM units (DPRAM) (430), multiple columns of stations (435, 440, 445, 450), and multiple quad MAC/PCS/SERDES units (455, 460, 465) bordering the HCIC (400). In one or more embodiments of the invention, the HCIC (400) is fabricated on a monolithic semiconductor substrate.

Although FIG. 4 only shows quad MAC/PCS/SERDES units (455, 460, 465) bordering one side of the HCIC (200), those skilled in the art, having the benefit of this detailed description, will appreciate other embodiments of the invention include quad MAC/PCS/SERDES units on multiple sides of the HCIC (400). Additionally, although FIG. 4 only shows a single column of SPRAM units (415), two columns of programmable logic device blocks (PLBs) (420), and a single column of DPRAM units (430), those skilled in the art, having the benefit of this detailed description, will also appreciate the HCIC (400) may have any number of columns of the mentioned components.

In one or more embodiments of the invention, a special-purpose block (425) is a reconfigurable frame parser unit. Although FIG. 4 only shows a single column of special-purpose blocks (425), those skilled in the art, having the benefit of this detailed description, will also appreciate other embodiments of the invention have multiple columns of special-purpose blocks, where each column contains a single type of special-purpose block (i.e., RCAM, RAU, etc.).

In one or more embodiments of the invention, the multiple stations (435, 440, 445, 450) form a data cross-connect (DCC) network. This DCC network is a two-dimensional grid of stations that spans the entire HCIC (400). In one or more embodiments of the invention, the DCC network is as described in U.S. application Ser. No. 11/901,182 entitled "High-Bandwidth Interconnect Network for an Integrated Circuit," which was previously incorporated by reference. In one or more embodiments of the invention, the HCIC (400) also includes a routing crossbar network (not shown) in a plane parallel to the DCC network.

Figure 5:
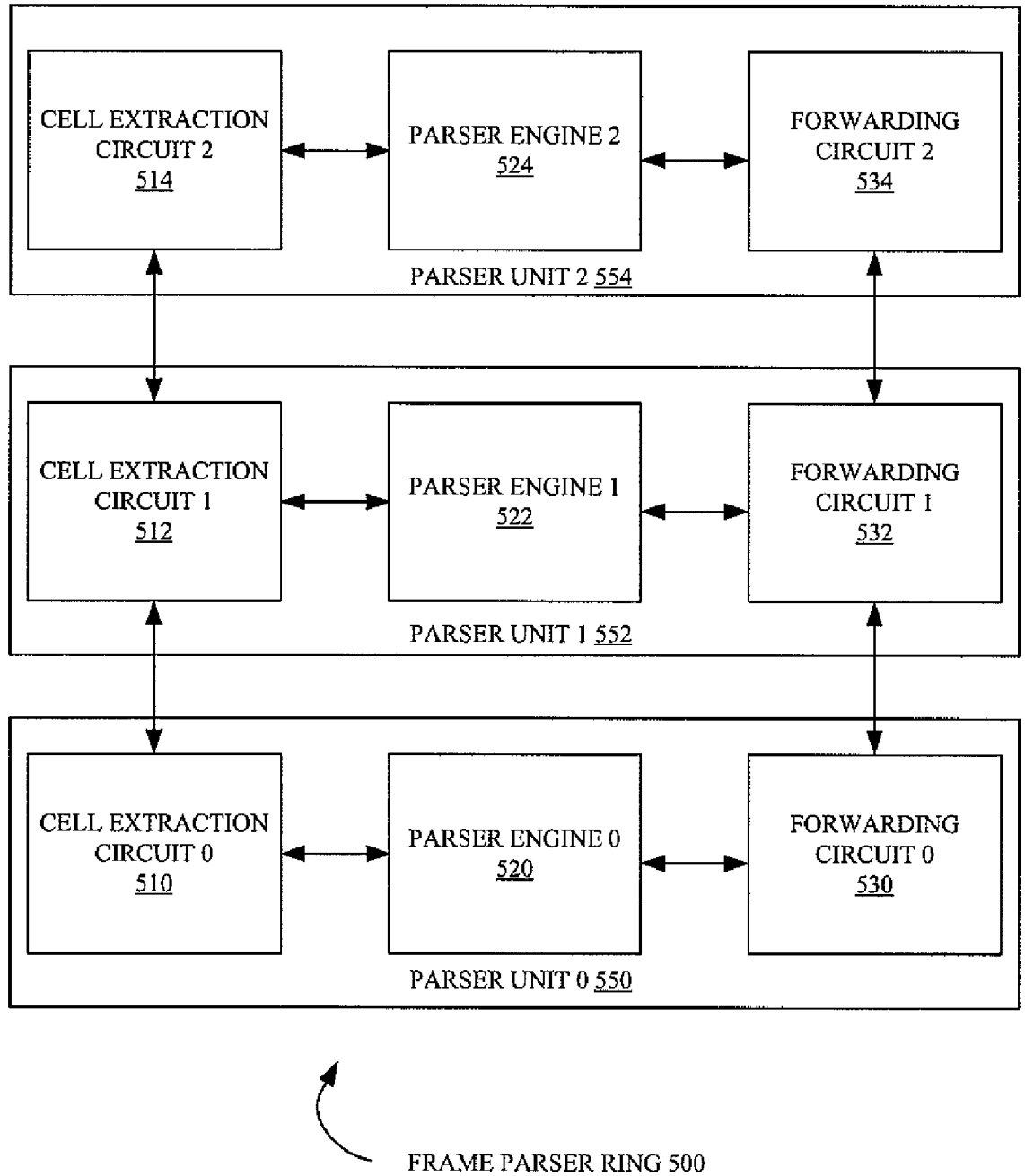
FIG. 5 shows a frame parser ring in accordance with one or more embodiments of the invention.

FIG. 5 shows multiple frame parser units (i.e., Parser Unit 0 (550), Parser Unit 1 (552), Parser Unit 2 (554)) in accordance with one or more embodiments of the invention. A frame parser unit may have numerous components including a cell extraction circuit (CEC) (510, 512, 514), a parser engine (520, 522, 524), a forwarding circuit (530, 532, 534), and one or more configuration registers (not shown). The numerous components (i.e., the CEC, the parser engine, and the forwarding circuit) may be connected to exchange data (e.g., one or more words). In addition, the cell extraction circuit (510, 512, 514) and the forwarding circuit (530, 532, 534) may be connected to the DCC network. The multiple components of the frame parser unit (550, 552, 554) are discussed in detail below.

In one or more embodiments of the invention, multiple frame parser units are configured to form a frame parser ring. As shown in FIG. 5, Parser Unit 0 (550), Parser Unit 1 (552), and Parser Unit 2 (554) may be configured to form the frame parser ring (500). In order to form a frame parser ring, the cell extraction circuits of abutting parser units may be connected to exchange data (e.g., one or more words). For example, the cell extraction circuit (510) and the cell extraction circuit (512) are connected to form frame parser ring (500). Similarly, the forwarding circuits of abutting parser units may also be connected to form a frame parser ring. For example, forwarding circuit (532) and forwarding circuit (534) are connected to form frame parser ring (500).

In one or more embodiments of the invention, each frame parser unit (550, 552, 554) occupies a position or rank within the frame parser ring (500). The position or ranking of a frame parser unit (550, 552, 554) may be stored in a configuration register associated with the frame parser unit. For example, Parser Unit 0 (550) may have a rank of "0" within the frame parser ring (500). Accordingly, the value of "0" may be stored in a configuration register associated with Parser Unit 0 (550). Similarly, Parser Unit 2 (554) may have a rank of "2" within the frame parser ring (500). Accordingly, the value of "2" may be stored in a configuration register associated with Parser Unit 2 (554).

In one or more embodiments of the invention, a frame enters the frame parser ring (500) via the frame parser unit with the highest rank (i.e., Parser Unit 2 (554)). In one or more embodiments of the invention, the same word and/or a result (discussed below) leave the frame parser ring (500) via the frame parser unit with the lowest rank (i.e., Parser Unit 0 (550)). Although embodiments of the invention have been described with a frame parser ring having three frame parser units, those skilled in the art, having the benefit of this detailed description, will appreciate a frame parser ring may include any number of frame parser units.

In one or more embodiments of the invention, the frame parser ring (500) is configured to operate with 10 gigabyte, 40 gigabyte, and/or 100 gigabyte Ethernet and/or synchronous optical network (SONET) systems.

Figure 6:
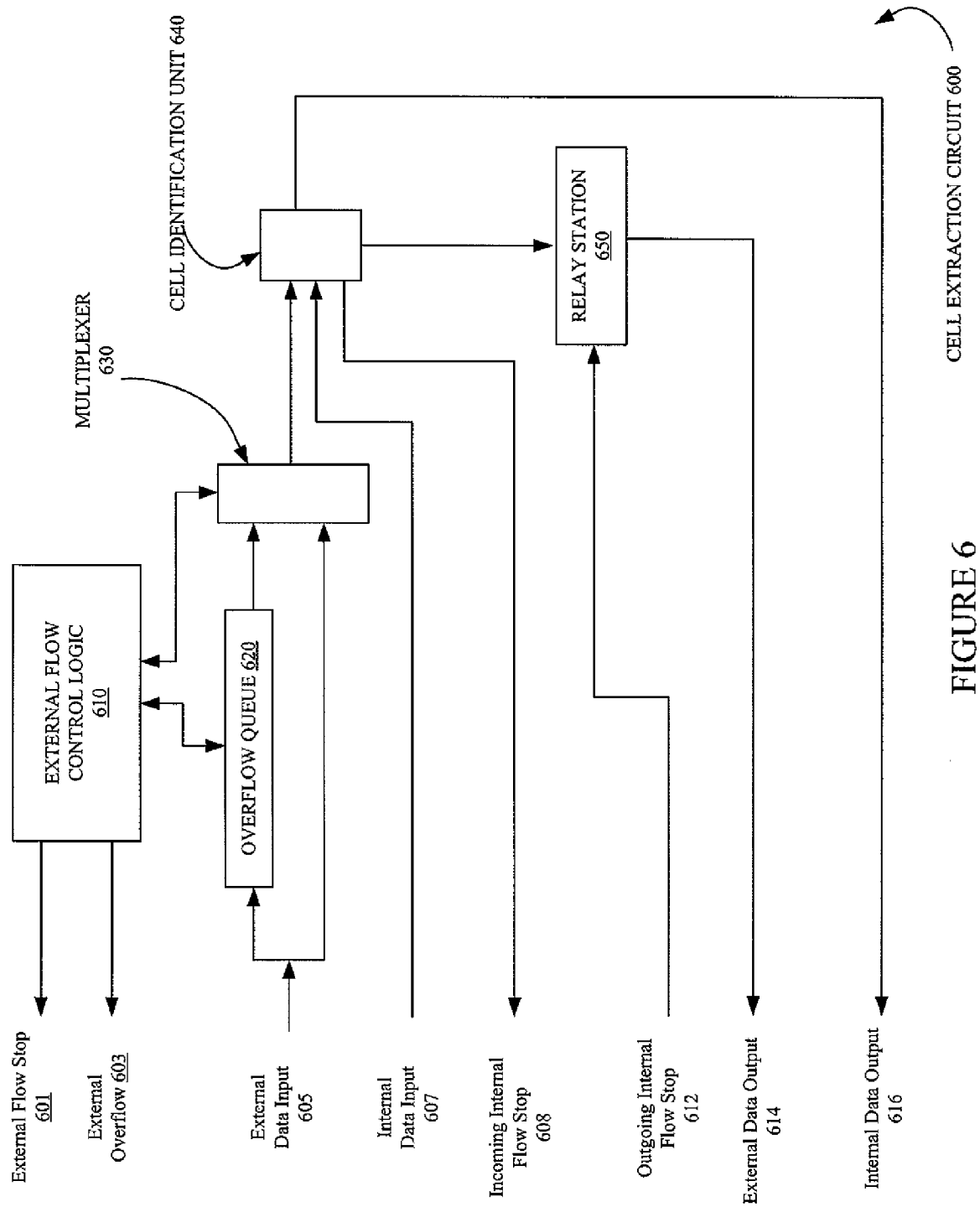
FIG. 6 shows a cell extraction circuit in accordance with one or more embodiments of the invention.

As discussed above, a frame parser unit may include a cell extraction circuit (510, 512, 514). FIG. 6 shows a cell extraction circuit (600) in accordance with one or more embodiments of the invention. The cell extraction circuits (510, 512, 514) discussed above in reference to FIG. 5 are essentially the same as the cell extraction circuit (600). As shown in FIG. 6, the cell extraction circuit (600) has several components including external flow control logic (EFCL) (610), an overflow queue (620), a multiplexer (630), a cell identification unit (640), and a relay station (650). The cell extraction circuit (600) may have numerous inputs (e.g., External Data Input (605), Internal Data Input (607), Outgoing Internal Flow Stop (612)) and numerous outputs (e.g., External Flow Stop (601), External Overflow (603), Incoming Internal Flow Stop (608), External Data Output (614), Internal Data Output (616)). The source of the inputs may be, for example, the DCC network and/or another cell extraction circuit. The sink of the outputs may be, for example, a parser engine associated with the CEC (600) and/or another cell extraction circuit. The inputs and outputs may be of any size, including 10, 20, 40, or 80 bits wide. The components, inputs, and outputs of the cell extraction circuit (600) are discussed in detail below.

In one or more embodiments of the invention, words representing a frame enter the cell extraction circuit (600) via either (i) the internal data input (607), or (ii) the external data input (605). The external data input (605) may be used to input words from the DCC network when the cell extraction circuit (600) is associated with the highest ranking parser unit in a frame parser ring. The internal data input (607) may be used to input words from another cell extraction circuit when the cell extraction circuit (600) is not associated with the highest ranking parser unit in a frame parser ring.

In one or more embodiments of the invention, the cell identification unit (640) is used to partition a frame represented by the incoming words into one or more cells. The cell identification unit (640) may be used to partition the incoming frame into N cells (N>0), where N−1 of the cells are of the maximum cell size and the $N^{th}$ cell (i.e., the final cell of the frame) is smaller than or equal to the maximum cell size.

In one or more embodiments of the invention, the cell identification unit (640) is configured to identify the end of a cell, and thus the start of the next cell, by either (i) counting incoming words (e.g., from the external data input (605) or the internal data input (607)) until the maximum cell size has been reached, and/or (ii) receiving an incoming word having a tag with the EOF bit set to "true".

Consider the following example which is not meant to limit the invention in any way. Assume for the example a frame is represented by 15 words and there is a predefined maximum cell size of 6 words. Accordingly, the frame may be partitioned into three cells. The first two cells may be of the maximum cell size (i.e., 6 words) and the final cell may be 3 words in size. The cell identification unit (640) may identify the end of the first two cells by counting the number of incoming words until the maximum cell size has been reached. The cell identification unit (640) may identify the end of the final cell, and thus the end of the frame, by the EOF bit with a value of "true" in the tag associated with the final word of the final cell.

In one or more embodiments of the invention, the cell identification unit (640) is configured to determine whether an identified cell is destined for the parser engine associated with the cell extraction circuit (600). For example, referring back to FIG. 5, the cell identification unit in Cell Extraction Circuit 1 (512) is configured to determine whether an identified cell is destined for Parser Engine 1 (522). In one or more embodiments of the invention, the destination of a cell is determined using a modulo operation. When Z is the total number of parser units in the frame parser ring, the destination of received cell k (k≧0) may be the parser engine of rank r, where r is given by:

$$r = k \bmod Z \tag{1}$$

Those skilled in the art, having the benefit of this disclosure, will appreciate the use of equation (1) in association with a frame parser ring results in a round-robin distribution of incoming cells to parser engines.

In one or more embodiments of the invention, when a cell is destined for the parser engine associated with the cell extraction circuit (600), the cell is forwarded to the parser engine via the internal data output (616). The cell may be forwarded to the parser engine as a sequence of words (i.e., the same sequence of words that originally arrived from the external data input (605) or the internal data input (607)).

In one or more embodiments of the invention, when the cell extraction circuit (600) is associated with a parser unit of rank r, the relay station (650) is configured to relay all incoming words to the cell extraction circuit associated with the parser unit of rank r−1 (i.e., the cell extraction circuit immediately below in the frame parser ring). In one or more embodiments of the invention, the relay station (650) includes one or more buffers (not shown) to temporarily store multiple words before relaying the words (discussed below).

In one or more embodiments of the invention, when a cell is destined for the parser engine associated with the cell extraction circuit (600), the words representing the incoming cell are invalidated before being relayed. Accordingly, no action will be taken by any other cell extraction circuit receiving the invalidated words (e.g., from Relay Station (650)). In one or more embodiments of the invention, a word is invalidated by setting the valid word (VW) bit of the tag to "false" (discussed above in reference to FIG. 2).

In one or more embodiments of the invention, the flow of data (i.e., one or more words) entering and leaving the cell extraction circuit (600) is controlled by the external flow control logic (EFCL) (610), the overflow queue (620), the multiplexer (630), and one or more control signals (i.e., External Flow Stop (601), External Overflow (603), Internal Flow Stop (612)).

In one or more embodiments of the invention, the overflow queue (620) is configured to store incoming words from the external data input (605). The overflow queue (620) may only be used to store incoming words when the cell identification unit (640) is unable to service the incoming words. The overflow queue (620) may store any number of words. In one or more embodiments of the invention, the overflow queue (620) is designed to store W words, where W is equal to the number of parser units in the associated frame parser ring.

In one or more embodiments of the invention, the EFCL (610) is configured to determine when the overflow queue (620) is full and/or when incoming data has been dropped. The EFCL (610) may communicate with the source of the data (not shown) using both the external flow stop (601) and the external overflow (603). When the overflow queue (620) begins to store incoming words, the EFCL (610) may instruct the data source (not shown) to temporarily stop data transmission by setting the external flow stop (601) to "true". When the incoming data is being lost or dropped, the EFCL (610) may instruct the data source to resend the prior transmission by setting the external overflow (603) to "true." In one or more embodiments of the invention, both the external flow stop (601) and the external overflow (603) are set to "false" under normal operating conditions.

In one or more embodiments of the invention, the multiplexer (630) receives words from both the overflow queue (620) and from the external data input (605). As shown in FIG. 6, the EFCL (610) may control the input selection of the multiplexer (630) in order for the cell identification unit (640) to service data in the overflow queue (620) prior to servicing any new incoming cells from the external data input (605).

As discussed above, relay station (650) is configured to relay all incoming words to another cell extraction circuit. The outgoing internal flow stop (612) may be a control signal received from the other cell extraction circuit. In one or more embodiments of the invention, the relay station (650) stops the relay of incoming words when outgoing internal flow stop (612) is received as "true". When outgoing internal flow stop (612) is received as "true," incoming cells are stored in the buffer of the relay station (650) until the internal flow stop (612) is received as "false".

As discussed above, words may arrive from another cell extraction unit via the internal data input (607). The incoming internal flow stop (608) may be a control signal from the cell identification unit (640) to the other cell extraction unit. In one or more embodiments of the invention, when the cell identification unit (640) cannot service any words arriving via the internal data input (607), the cell identification unit (640) may set the incoming internal flow stop (608) to "true," temporarily preventing the other cell extraction unit from transmitting. The cell identification unit (640) may set the incoming internal flow stop (608) to "false" when the cell identification unit (640) is no longer busy.

Figure 7:
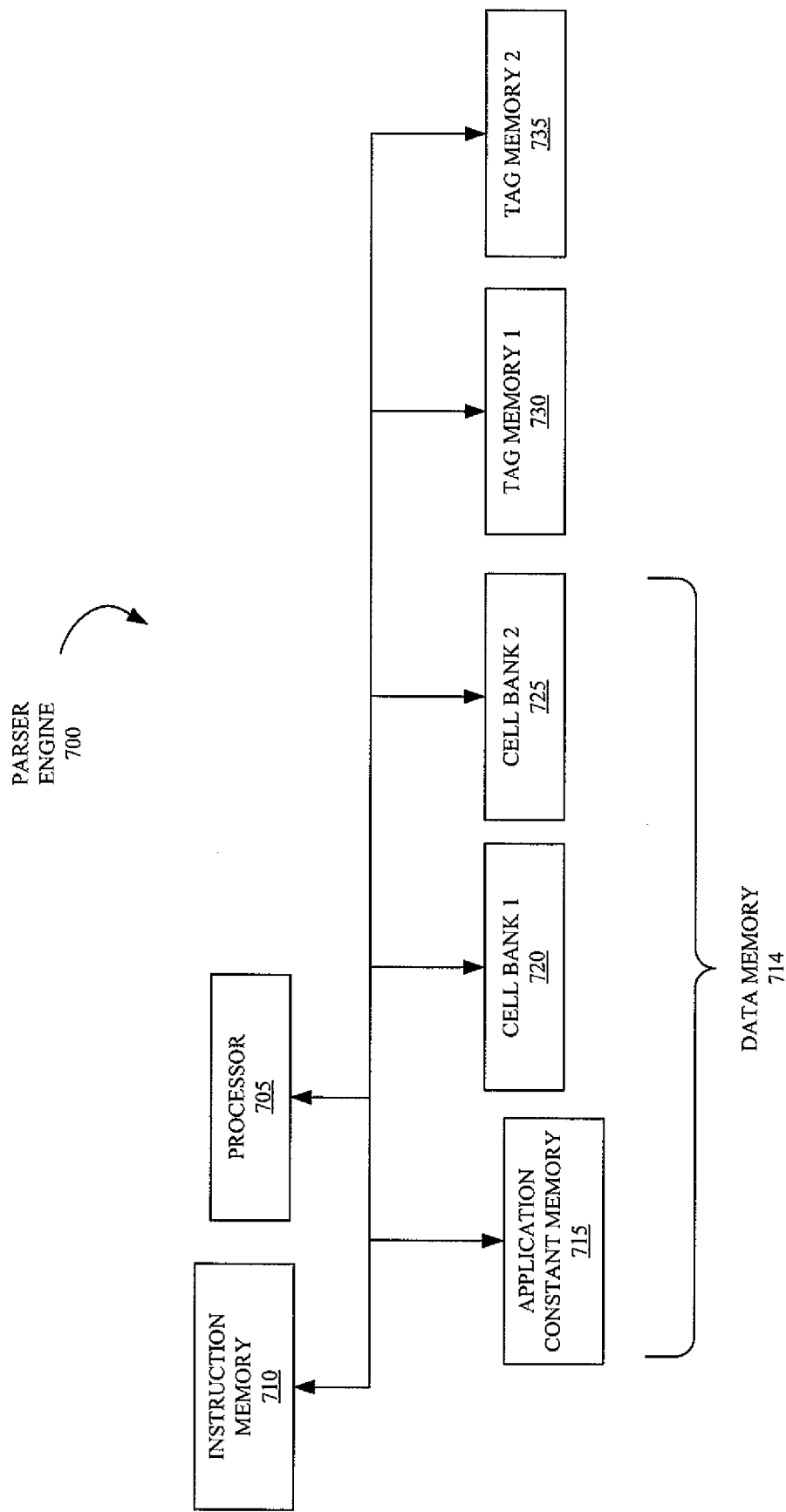
FIG. 7 shows a parser engine in accordance with one or more embodiments of the invention.

Referring back to FIG. 5, a frame parser unit may include a parser engine (520, 522, 524). FIG. 7 shows a parser engine (700) in accordance with one or more embodiments of the invention. The parser engine may have numerous components including a processor (705), an instruction memory (710), a data memory (714) (ie., Application Constants Memory (715), Cell Bank 1 (720), Cell Bank 2 (725)), and multiple tag memories (i.e., Tag Memory 1 (730) and Tag Memory 2 (735)). Each component of the parser engine (700) is discussed in detail below.

In one or more embodiments of the invention, each cell bank (i.e., Cell Bank 1 (720), Cell Bank 2 (725)) is configured to store a cell received from a cell extraction circuit. The parser engine (700) may toggle between the use of Cell Bank 1 (720) and Cell Bank 2 (725) when storing received cells. In other words, when Cell Bank 1 (720) already stores a cell, the next received cell is stored in Cell Bank 2 (725) and vice versa. A cell bank may also be configured to store a generated result associated with the cell located in the cell bank (discussed below). The starting address of the cell in the cell bank and of the result in the cell bank may be set during configuration. In one or more embodiments of the invention, Cell Bank 1 (720) and Cell Bank 2 (725) are both 256 bytes in size. Every byte of Cell Bank 1 (720) and Cell Bank 2 (725) may be protected by a parity bit (not shown).

As discussed above, a frame may be represented by a sequence of words. In one or more embodiments of the invention, Tag Memory 1 (730) and Tag Memory 2 (735) store the tags of the words representing the cells stored in Cell Bank 1 (720) and Cell Bank 2 (725). In other words, the tag of each word representing the cell stored in Cell Bank 1(720) is stored in Tag Memory 1 (730). Similarly, the tag of each word representing the cell stored in Cell Bank 2 (725) is stored in Tag Memory 2 (735). In one or more embodiments of the invention, only the user-defined bits and the EOF bit of a tag (discussed above in reference to FIG. 3) are stored in Tag Memory 1 (730) or Tag Memory 2 (735).

In one or more embodiments of the invention, the instruction memory (710) stores a sequence of instructions to be executed on a frame header. In one or more embodiments of the invention, the instruction memory (710) of all parser engines in a frame parser ring store the identical sequence of instructions. The sequence of instructions may be loaded into the instruction memory (710) by a user (not shown) during configuration. The sequence of instructions may only be changed by reloading the instruction memory (710). In one or more embodiments of the invention, the instruction memory (710) is configured to store a maximum of 512 instructions, where each of the instructions is 21 bits in size. A "done" instruction may be used to identify the end of the sequence of instructions. Each instruction stored in the instruction memory (710) may be protected using a parity bit (not shown).

In one or more embodiments of the invention, the application constants memory (715) may be configured to store one or more constants required by the sequence of instructions stored in instruction memory (710). In one or more embodiments of the invention, the applicant constant memory (715) is 256 bytes in size, and each byte is protected using a parity bit (not shown).

In one or more embodiments of the invention, the processor (705) may be configured to execute the sequence of instructions stored in the instructional memory (710) on a cell stored in Cell Bank 1 (720) or Cell Bank 2 (725). In one or more embodiments of the invention, each instruction of the sequence of instructions is executed in one machine cycle. The processor (705) may always execute the sequence of instructions beginning with the instruction at the first address of the instructional memory (710). In one or more embodiments of the invention, the processor (705) only executes the sequence of instructions on a header cell. In other words, when the cell in the cell bank is not a header cell, and thus the cell does not include a frame header, the processor (705) will not execute the sequence of instructions. In one or more embodiments of the invention, the processor identifies a header cell based on the start of frame (SOF) bit (discussed above in reference to FIG. 2).

Referring back to FIG. 5, a frame parser unit may also include a forwarding circuit (530, 532, 534). As discussed above, a parser engine may store a generated result and/or a cell in a cell bank. In one or more embodiments of the invention, a forwarding circuit is configured to obtain the content of the cell bank and forward the content to either (i) the DCC network, or (ii) a forwarding circuit of lower rank. When the content includes a cell, the cell may be forwarded as a sequence of words. The tag of each word may be reconstructed using the values stored in one of the tag memories (discussed above) of the associated parser engine.

The forwarding circuit (530, 532, 534) may use a relay station (not shown) to forward the content of the cell bank. A forwarding circuit may also be configured to accept and forward content from other, higher ranking, forwarding circuits in a frame parser ring. A chain of forwarding circuits (530, 532, 534) in a frame parser ring may be referred to as a send path.

In one or more embodiments of the invention, the forwarding circuit of lowest rank (e.g., Forwarding Circuit (530)) outputs all content (i.e., a result and/or cell) to the DCC network. In one or more embodiments of the invention, content may be outputted to the DCC network using one of two ports. In one or more embodiments of the invention, one port is used when the result is valid and the other port is used when the result is invalid (i.e., resulting from a timeout, etc.).

Consider the following example which is not meant to limit the invention in any way. The forwarding circuits (530, 532, 534) form a send path. Forwarding Circuit 2 (534) is configured to obtain content (i.e., a generated result and/or a cell) from a cell bank of Parser Engine 2 (524) and forward the content to Forwarding Circuit 1 (532). Similarly, Forwarding Circuit 1 (532) may be configured to obtain the content from a cell bank of Parser Engine 1 (522) and forward the content to Forwarding Circuit 0 (530). In addition, Forwarding Circuit 1 (532) may be configured to accept content from Forwarding Circuit 2 (534) and forward the content to Forwarding Circuit 0 (530). Forwarding Circuit 0 (530) may be configured to output all content to the DCC network.

In one or more embodiments of the invention, a forwarding circuit must be enabled before it can obtain and forward content from a parser engine. However, even when a forwarding circuit is not enabled, the forwarding circuit may still receive and forward content from other forwarding circuits. Accordingly, the order in which the content from each frame parser unit is outputted to the DCC network may be controlled by the sequence in which the forwarding circuits are enabled and disabled.

Figure 8:
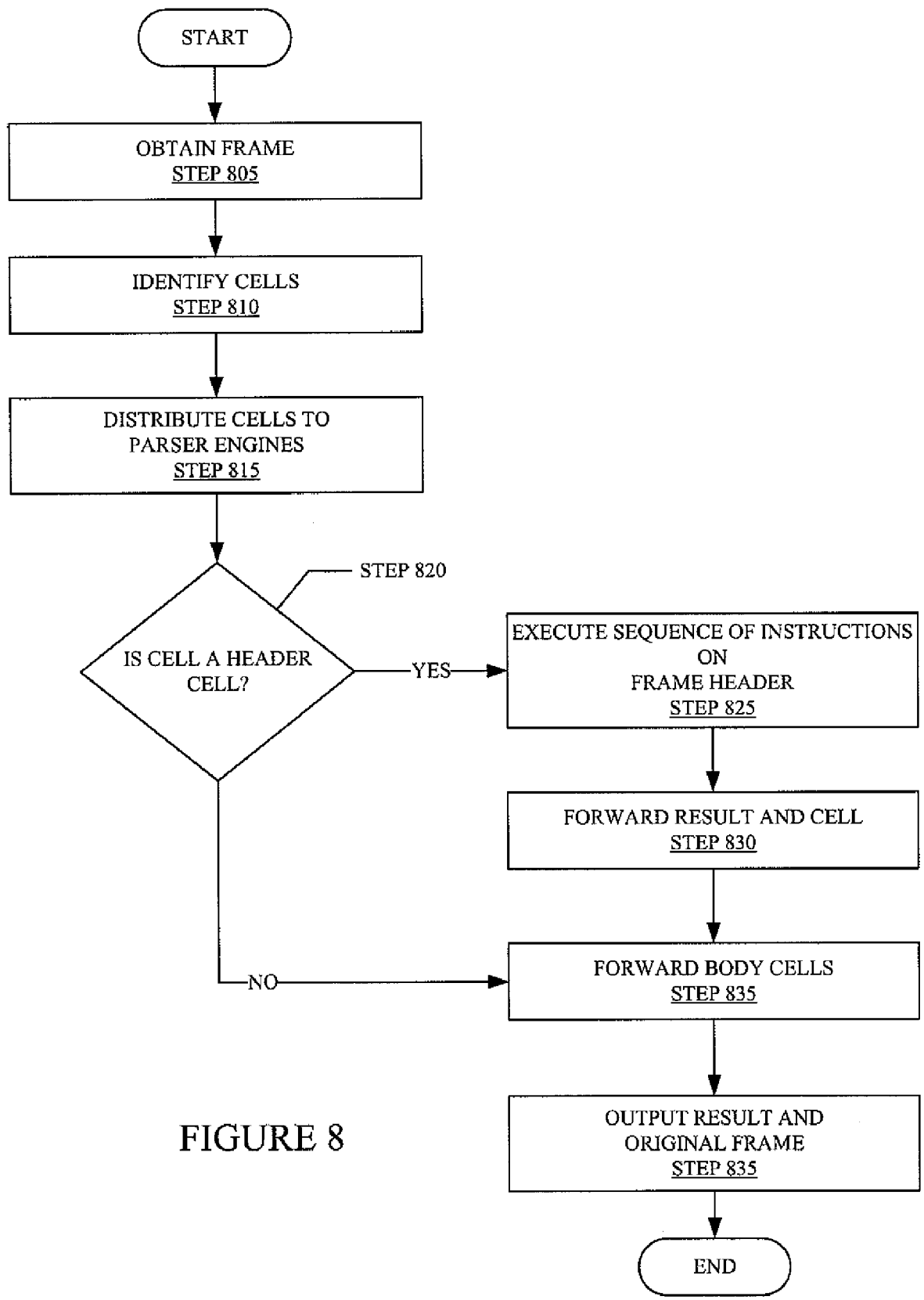
FIGS. 8 and 9 show flowcharts in accordance with one or more embodiments of the invention.

In one or more embodiments of the invention, a frame parser ring is configured to operate in either (i) Prepend-Result Mode, or (ii) Result-Only Mode. FIG. 8 shows a flowchart in accordance with one or more embodiments of the invention. The process shown in FIG. 8 may be executed when a frame parser ring is operating in Prepend-Result Mode.

Initially, the frame parser ring obtains a frame (STEP 805). As discussed above, a frame may be represented as a sequence of words. The sequence of words representing the frame may be obtained from a DCC network. In one or more embodiments of the invention, the cell extraction circuit with the highest rank (discussed above) obtains the sequence of words for the frame parser ring. In one or more embodiments of the invention, the obtained sequence of words is relayed to all cell extraction circuits in the frame parser ring.

In STEP 810, the cell extraction circuits in the frame parser ring partition the frame (i.e., the sequence of words) into one or more cells. As discussed above, the cells may be identified by either (i) counting words until the maximum cell size has been reached, or (ii) identifying a word with a tag having the end of frame (EOF) bit set to "true."

In STEP 815, each identified cell (STEP 810) is assigned to a parser engine of the frame parser ring. In one or more embodiments of the invention, the identified cells are distributed to the parser engines in a round-robin scheme. In one or more embodiments of the invention, distribution of the identified cells begins with the lowest ranked parser engine.

In STEP 820, each parser engine determines whether the cell it has received following the distribution (STEP 815) is a header cell. In one or more embodiments of the invention, a header cell is identified using the start of frame (SOF) bit (discussed above in reference to FIG. 2). As discussed above, a header cell may include the frame header. When a parser engine determines it has received a header cell, the parser engine executes its stored sequence of instructions on the frame header. The generated result following execution of the sequence of instructions may be stored in the parser engine with the cell (STEP 825).

In STEP 830, the generated result and the header cell are obtained from the parser engine and forwarded (e.g., using a forwarding circuit) down a send path of the frame parser ring. In addition, the body cells are obtained from the various parser engines and forwarded down the send path (STEP 835). In one or more embodiments of the invention, the send path is configured to reassemble the frame from the header cell and body cells. In one or more embodiments of the invention, the forwarding circuit with the lowest rank in the frame parser ring outputs (i.e., to the DCC network) the result prepended to the reassembled frame.

Figure 9:
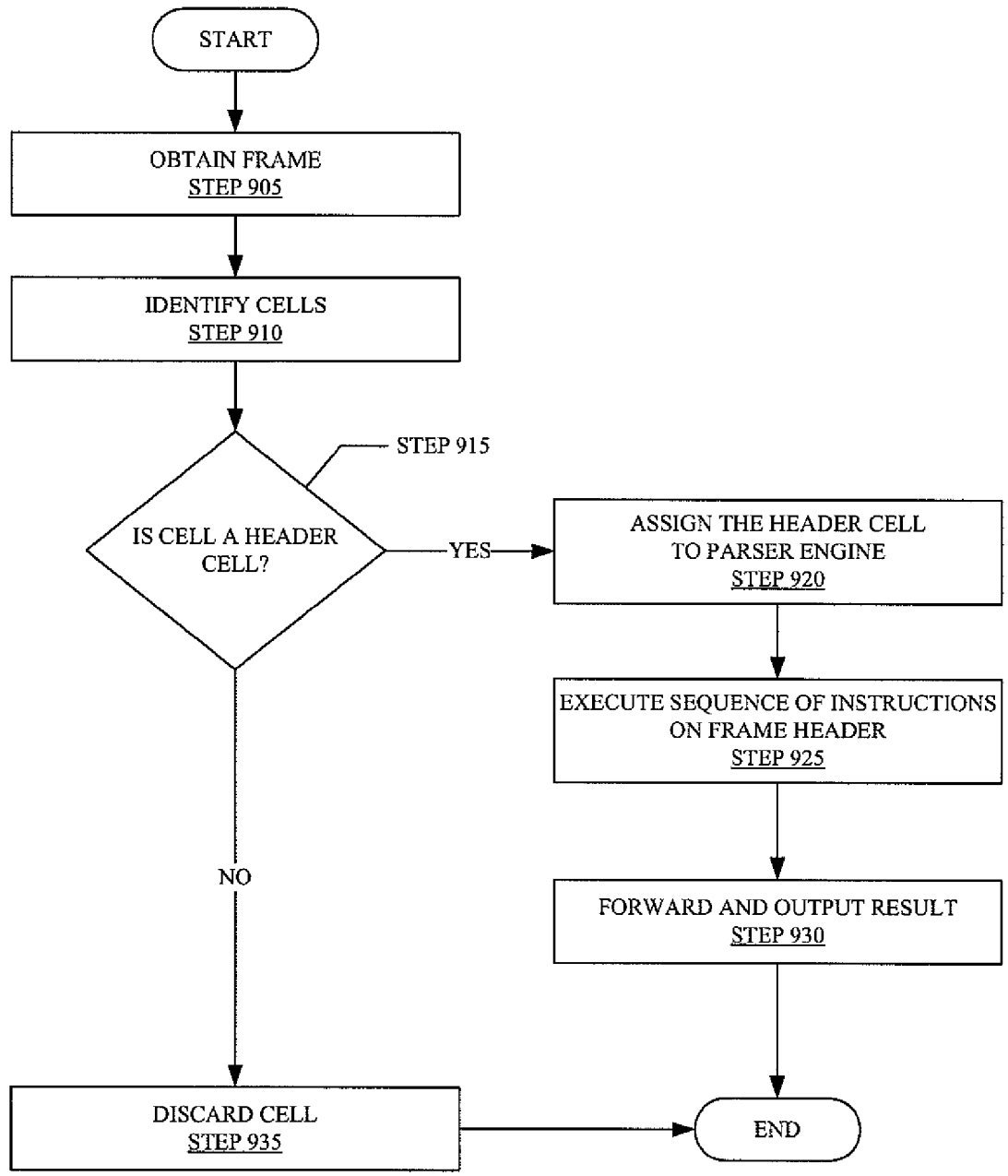

FIG. 9 shows a flowchart in accordance with one or more embodiments of the invention. The process shown in FIG. 9 may be executed when a frame parser ring is operating in Result-Only Mode.

Initially, the frame parser ring obtains a frame (STEP 905). STEP 905 is essentially the same as STEP 805 (discussed above in reference to FIG. 8). In STEP 910, the cell extraction circuits of the frame parser ring partition the frame (i.e., the sequence of words) into one or more cells. STEP 910 is essentially the same as STEP 810 (discussed above in reference to FIG. 8).

In STEP 915, each cell is examined to determine whether it is a header cell. In one or more embodiments of the invention, a header cell is identified using the start of frame (SOF) bit (discussed above in reference to FIG. 2). When it is determined that the cell is not a header cell, the cell is discarded (STEP 935). When it is determined that the cell is a header cell, the process proceeds to STEP 920.

In STEP 920, the header cell is assigned to a parser engine. In one or more embodiments of the invention, header cells are assigned to the parser engines using a round-robin scheme. A parser engine may store the header cell in an available cell bank (discussed above). As discussed above, a header cell may include a frame header. In STEP 925, the parser engine executes its stored sequence of instructions on the frame header located in the header cell. The generated result following execution of the sequence of instructions may be stored in the parser engine with the cell.

In STEP 930, the generated result (STEP 925) is obtained and forwarded (e.g., by a forwarding circuit) down a send path. The send path is responsible for outputting the result to the DCC network.

Figure 10A:
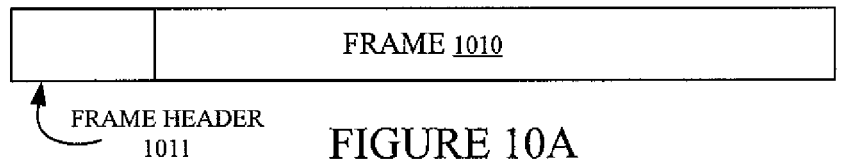
FIGS. 10A-10D show example scenarios in accordance with one or more embodiments of the invention.

FIGS. 10A-10D show example scenarios in accordance with one or more embodiments of the invention. The example scenarios shown in FIGS. 10A-10D are associated with the prepend-result mode of a frame parser ring. FIG. 10A shows a frame (1010) prior to entering a frame parser ring (not shown). The frame (1010) includes a frame header (1011). The frame (1010) may travel to the frame parser ring on a DCC network as a sequence of words (not shown).

Figure 10B:
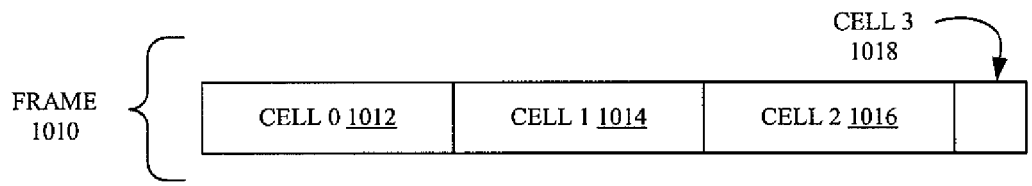

FIG. 10B shows the frame (1010) after it has been partitioned by the frame parser ring (e.g., using cell extraction circuits) into multiple cells (i.e., Cell 0 (1012), Cell 1 (1014), Cell 2 (1016), and Cell 3 (1018)). Cell 0 (1012) may include the frame header. Accordingly, Cell 0 (1012) may be the header cell. Cell 1 (1014), Cell 2 (1016), and Cell 3 (1018) may be body cells. Those skilled in the art, having the benefit of this detailed description, will appreciate Cell 0 (1012), Cell 1 (1014), and Cell 2 (1016) may be identical in size.

Figure 10C:
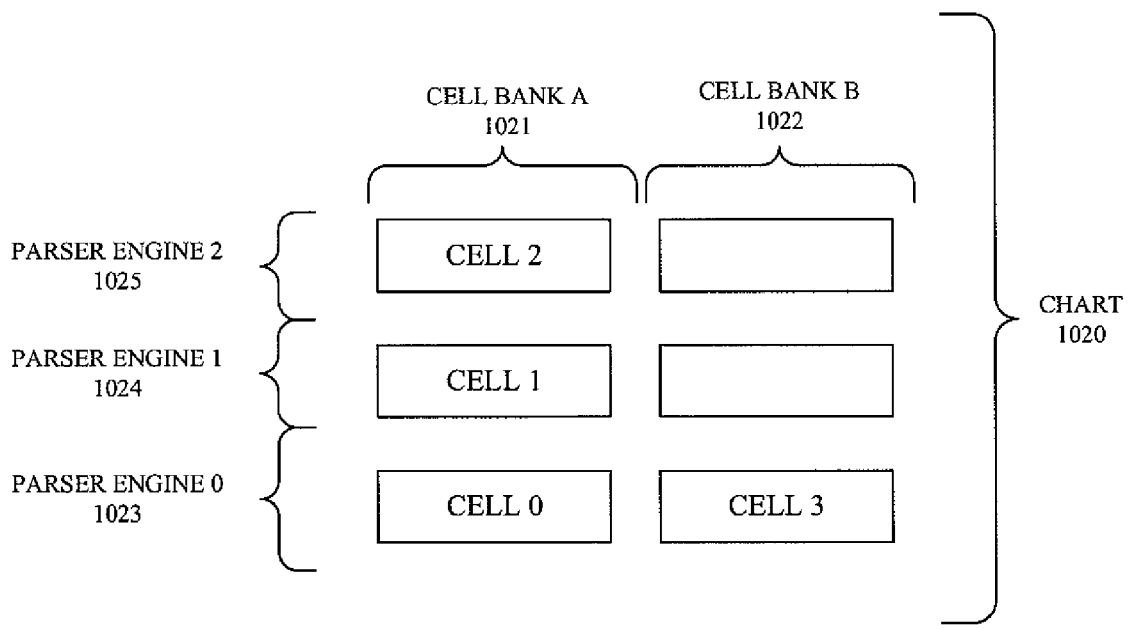

FIG. 10C shows a chart (1020) outlining the structure of the frame parser ring and the distribution of the cells among the parser engines of the frame parser ring. As shown by the chart (1020), the frame parser ring has three parser engines (i.e., Parser Engine 0 (1023), Parser Engine 1 (1024), Parser Engine 2 (1025)). Each parser engine includes two cell banks (i.e., Cell Bank A (1021), Cell Bank B (1022)). Following distribution of the cells among the parser engines, Cell 0 is assigned (i.e., stored) in Cell Bank A (1021) of Parser Engine 0 (1023), Cell 1 is assigned to Cell Bank A (1021) of Parser Engine 1 (1024), Cell 2 is assigned to Cell Bank A (1021) of Parser Engine 2 (1025), and Cell 3 is assigned to Cell Bank B (1022) of Parser Engine 0 (1023). Those skilled in the art, having the benefit of this detailed description, will appreciate the cells have been distributed among the parser engines in a round-robin scheme starting with Parser Engine 0 (1023). Those skilled in the art, having the benefit of this description, will also appreciate Cell 3 is stored in Cell Bank B (1022) of Parser Engine 0 (1023) because Cell 0 is occupying Cell Bank A (1021) of Parser Engine 0 (1023).

Figure 10D:
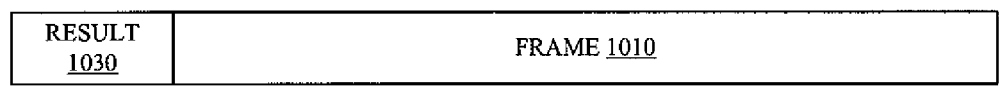

As discussed above, Cell 0 (1012) may be the header cell. Accordingly, Parser Engine 0 executes its sequence of instructions on the frame header (1011) located in the header cell. Execution may begin as soon as Cell 0 has been stored in Cell Bank A (1021). The generated result following execution may also be stored in Cell Bank A (1021) of Parser Engine 0 (1023). When Parser Engine 0 (1023) has completed execution of its sequence of instructions, all the cells may be obtained from the cell banks (e.g., by multiple forwarding circuits) and reassembled to form the frame (1011). The result may be prepended to the reassembled frame and outputted from the frame parser ring. FIG. 10D shows the output from the frame parser ring (i.e., Result (1030) prepended to frame (1010)).

Figure 11A:
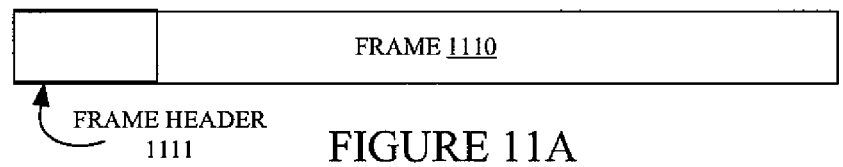
FIG. 11A-11D show example scenarios in accordance with one or more embodiments of the invention.

FIGS. 11A-11D show example scenarios in accordance with one or more embodiments of the invention. The example scenarios shown in FIGS. 11A-11D are associated with the result-only mode of a frame parser ring. FIG. 11A shows a frame (1110) prior to entering a frame parser ring (not shown). The frame (1110) includes a frame header (1111). The frame (1110) may travel to the frame parser ring on a DCC network as a sequence of words (not shown).

Figure 11B:
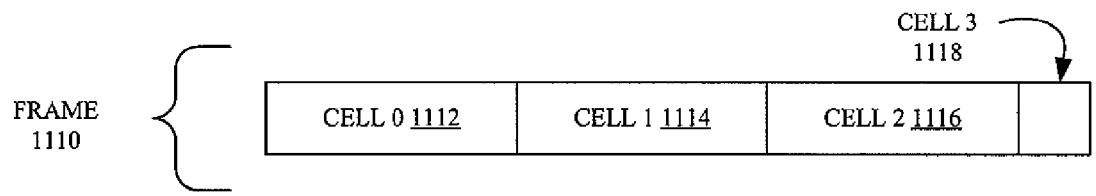

FIG. 11B shows the frame (1110) after it has been partitioned (e.g., using cell extraction circuits) into multiple cells (i.e., Cell 0 (1112), Cell 1 (1114), Cell 2 (1116), and Cell 3 (1118)). Cell 0 (1112) may include the frame header.

Accordingly, Cell 0 (1112) may be the header cell. Cell 1 (1114), Cell 2 (1116), and Cell 3 (1118) may be body cells. Those skilled in the art, having the benefit of this detailed description, will appreciate Cell 0 (1112), Cell 1 (1114), and Cell 2 (1116) may be identical in size.

Figure 11C:
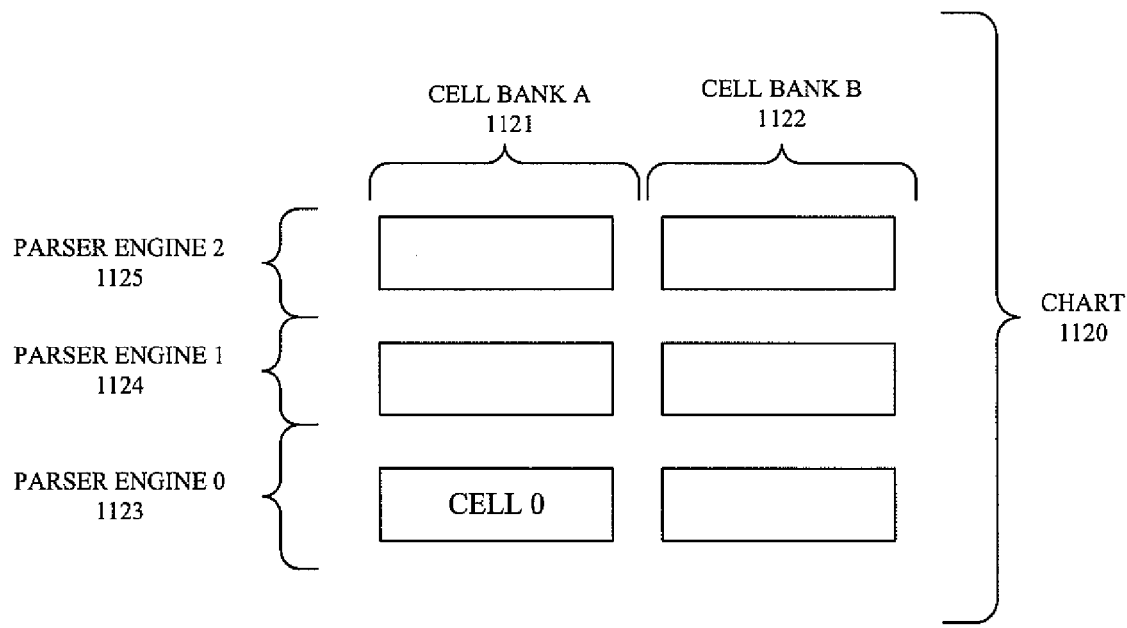
Figure 11D:
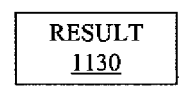

FIG. 11C shows a chart (1120) detailing the structure of the frame parser ring and the distribution of the cells among the parser engines of the frame parser ring. As shown by the chart (1120), the frame parser ring has three parser engines (i.e., Parser Engine 0 (1123), Parser Engine 1 (1124), Parser Engine 2 (1125)). Each parser engine includes two cell banks (i.e., Cell Bank A (1121), Cell Bank B (1122)). Following distribution of the cells among the parser engines, Cell 0 is assigned (i.e., stored) in Cell Bank A (1121) of Parser Engine 0 (1123). The remaining are discarded because they are body cells.

As discussed above, Cell 0 (1112) may be the header cell. Accordingly, Parser Engine 0 executes its sequence of instructions on the frame header (1011) located in the header cell. Execution may begin as soon as Cell 0 has been stored in Cell Bank A (1021). The generated result following execution may also be stored in Cell Bank A (1021) of Parser Engine 0 (1023). When Parser Engine 0 (1023) has completed execution of its sequence of instructions, the generated result may be obtained from Cell Bank A (1121) and outputted from the frame parser ring. FIG. 10D shows the output from the frame parser ring (i.e., Result (1130).

In one or more embodiments of the invention, a frame header may require extensive processing at multi-gigabit rates. The processing capabilities of a single parser engine may be insufficient to satisfy the processing requirements of the frame header. In one or more embodiments of the invention, multiple frame parser rings are cascaded (i.e., pipelining) to satisfy the processing needs of a frame header. The generated result from intermediate stages may be used to help process the frame header at the next stage.

Figure 12:
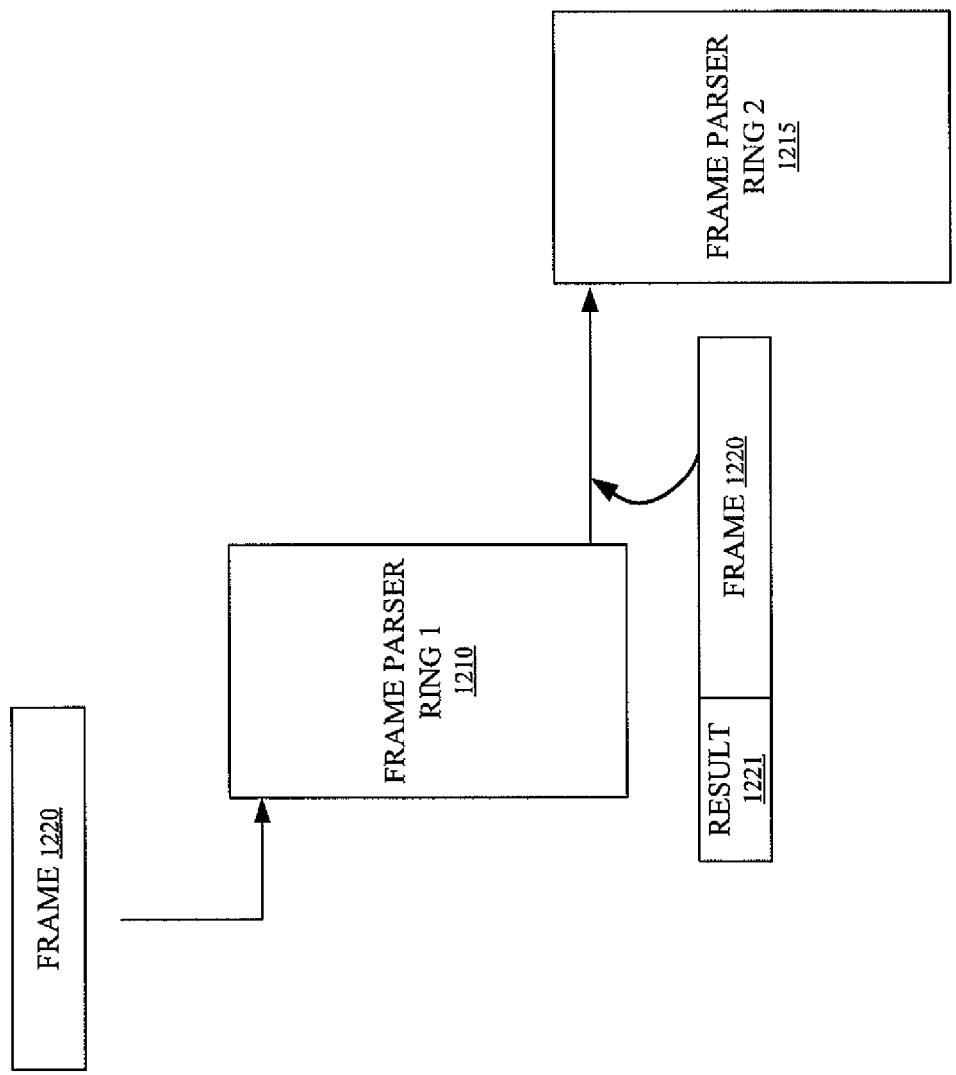
FIG. 12 shows cascaded frame parser rings in accordance with one or more embodiments of the invention.

FIG. 12 shows cascaded (i.e., pipelined) frame parser rings in accordance with one or more embodiments of the invention. As shown in FIG. 12, the output of frame parser ring 1 (1210) serves as the input to frame parser ring 2 (1215). A frame (1220) arriving at frame parser ring 1 (1210) (e.g., via the DCC network) may have its header processed by a parser engine associated with frame parser ring 1 (1210). Frame parser ring 1 (1210) may reassemble the received frame and output it along with a generated result (1221). The reassembled frame (1220) and prepended result (1221) may then arrive at frame parsers ring 2 (1215). Frame parser ring 2 (1215) may further process the frame header with the aid of the prepended result (1221). A final result and/or reassembled frame (not shown) may be outputted (e.g., to the DCC network) by frame parser ring 2 (1215).

Those skilled in the art, having the benefit of this detailed description, will appreciate that one or more embodiments of the invention are suited for header pushing. Header pushing may include the insertion of one or more fields into the frame header (e.g., multi-protocol label switching (MPLS) labels, virtual local area networks (VLAN) tags, etc.). Header pushing may be executed in preparation for transmitting a frame across a network.

Those skilled in the art, having the benefit of this detailed description, will appreciate that one or more embodiments of the invention are suited for header popping. Header pooping may include the removal of one or more fields from the frame header (e.g., multi-protocol label switching (MPLS) labels, virtual local area networks (VLAN) tags, etc.). Header popping may be executed when a frame has completed transmission across a network and is ready for delivery to the final client destination.

Those skilled in the art, having the benefit of this detailed description, will appreciate that one or more embodiments of the invention are suited for header swapping. Header swapping may include the reading, analysis, and in-place modification of one or more fields in the frame header (e.g., the modification of the time to live field (TTL) in an internet protocol (IP) packet, etc.).

Those skilled in the art, having the benefit of this detailed description, will appreciate that one or more embodiments of the invention are suited for tagging a packet for discard, discarding the packet immediately, re-routing the packet to a local management processor or host port for further analysis as part of exception handling.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for parsing frames comprising:
   a first cell extraction circuit (CEC) configured to identify a first cell from a first frame, wherein the first cell comprises a header of the first frame;
   a first parser engine operatively connected to the first CEC, wherein the first parser engine is configured to generate a result based on the first cell;
   a first forwarding circuit operatively connected to the first parser engine and configured to forward the result, wherein the first CEC, the first parser engine, and the first forwarding circuit are associated with a first frame parser unit;
   a second CEC operatively connected to the first CEC and configured to identify a second cell associated with a second frame;
   a second forwarding circuit operatively connected to the first forwarding circuit; and
   a second parser engine operatively connected to both the second CEC and the second forwarding circuit,
   wherein the second CEC, the second forwarding circuit, and the second parser engine are associated with a second frame parser unit, and
   wherein the first parser unit and the second parser unit are associated with a first frame parser ring.

2. The system of claim 1, wherein one selected from the group consisting of the first CEC and the second CEC inputs the first frame into the first frame parser ring.

3. The system of claim 1, wherein one selected from group consisting of the first forwarding circuit and the second forwarding circuit outputs the result from the first frame parser ring.

4. The system of claim 1, wherein one selected from a group consisting of the first forwarding circuit and the second forwarding circuit outputs the frame and the result from the first frame parser ring.

5. The system of claim 1, wherein the first frame parser unit and the second frame parser unit abut on a heterogeneous configurable integrated circuit.

6. The system of claim 5, wherein one selected from the group consisting of the first CEC and the second CEC inputs the second frame into the first frame parser ring.

7. The system of claim 1, further comprising:
   a second frame parser ring operatively connected to the first frame parser ring,
   wherein the second frame parser ring processes an output of the first frame parser ring.

8. A method for parsing frame comprising:
   identifying a first header cell and a plurality of body cells associated with a first frame;
   transferring the first header cell to a first parser engine of a plurality of parser engines;
   executing a plurality of instructions to generate a first result based on the first header cells; and
   outputting the first result from the first parser engine; and
   modifying the plurality of instructions stored in the first parser engine by reloading the first parser engine.

9. The method of claim 8, further comprising storing a tag associated with the first header cell in a tag memory associated with the first parser engine.

10. The method of claim 8, further comprising reconstructing a tag associated with the first frame after executing the plurality of instructions.

11. The method of claim 8, wherein identifying the first header cell and the plurality of body cells comprises using at least one selected from the group consisting of a maximum cell size and a tag associated with the first frame.

12. The method of claim 8, further comprising:
   distributing the plurality of body cells among the plurality of parser engines;
   obtaining the first header cell and the plurality of body cells from the plurality of parser engines after executing the plurality of instructions;
   reassembling the first frame; and
   outputting the first frame.

13. The method of claim 8, wherein at least one selected from a group consisting of outputting the first result and outputting the first frame comprises determining an output port.

14. The method of claim 8, wherein distributing the plurality of cells comprises:
   using a round-robin scheme.

15. The method of claim 8, wherein distributing the plurality of cells comprises:
   toggling between two banks of cell memory in at least one of the plurality of parser engines.

16. The method of claim 8, further comprising:
   identifying a second header cell associated with a second frame;
   transferring the second header cell to a second parser engine of the plurality of parser engines, wherein the second parser engine;
   executing the plurality of instructions to generate a second result based on the second header cell.

17. A method for parsing frame comprising:
   identifying a first header cell and a plurality of body cells associated with a first frame;
   transferring the first header cell to a first parser engine of a plurality of parser engines;
   executing a plurality of instructions to generate a first result based on the first header cells; and
   outputting the first result from the first parser engine;
   wherein each of the plurality of parser engines is associated with at least one of a plurality of frame parser units and wherein each of the plurality of frame parser units is a special-purpose block on a heterogeneous configurable integrated circuit;
   wherein the plurality of frame parser units is associated with a frame parser ring.

* * * * *